United States Patent
Simpson et al.

(10) Patent No.: US 10,598,205 B2
(45) Date of Patent: Mar. 24, 2020

(54) FASTENING DEVICE AND METHOD (71) Applicant: Semblex Corporation, Elmhurst, IL (US)

(72) Inventors: Gene M. Simpson, Elmhurst, IL (US); Eric C. Breidenbaugh, Elmhurst, IL (US)

(73) Assignee: SEMBLEX CORPORATION, Elmhurst, IL (US)

( * ) Notice: Subject to any disclaimer, the term of this patent is extended or adjusted under 35 U.S.C. 154(b) by 107 days.

(21) Appl. No.: 15/900,507

(22) Filed: Feb. 20, 2018

(65) Prior Publication Data

US 2019/0257344 A1 Aug. 22, 2019

(51) Int. Cl.
*F16B 25/10* (2006.01)
*F16B 25/00* (2006.01)
*B21J 5/06* (2006.01)

(52) U.S. Cl.
CPC ............. *F16B 25/106* (2013.01); *B21J 5/066* (2013.01); *F16B 25/0031* (2013.01); *F16B 25/10* (2013.01)

(58) Field of Classification Search
CPC .............. F16B 25/0031; F16B 25/0068; F16B 25/0084; F16B 25/10; F16B 25/106; F16B 35/065; B21J 5/066
USPC .............................. 411/386, 387.8, 411, 412
See application file for complete search history.

(56) References Cited

U.S. PATENT DOCUMENTS

| | | | | | |
|---|---|---|---|---|---|
| 3,156,152 | A | * | 11/1964 | Reed | F16B 25/106 411/386 |
| 3,207,023 | A | * | 9/1965 | Knohl | F16B 25/0031 411/387.3 |
| 4,104,446 | A | * | 8/1978 | Johnson | B21H 3/027 411/411 |
| 4,544,313 | A | | 10/1985 | Grossberndt | |
| 5,061,136 | A | * | 10/1991 | Dixon | F16B 13/02 411/386 |
| 5,188,496 | A | * | 2/1993 | Giannuzzi | F16B 25/00 411/310 |
| 5,234,301 | A | * | 8/1993 | Grossberndt | B21J 5/066 411/386 |

(Continued)

OTHER PUBLICATIONS

Weber, Austin, "Assembling Ford's Aluminum Wonder Truck," Assembly Magazine, Mar. 3, 2015, retrieved Feb. 12, 2018, pp. 1-12, https://www.assemblymag.com/articles/92728-assembling-fords-aluminum-wonder-truck.

(Continued)

*Primary Examiner* — Roberta S Delisle
(74) *Attorney, Agent, or Firm* — Greer Burns & Crain, Ltd.

(57) ABSTRACT

A fastening device for reducing the time required for insertion that includes an elongated shank portion extending longitudinally between a first and a second shank end; and a head portion arranged at the second shank end, wherein the head portion includes a drive arrangement configured and arranged for receiving a rotary driving force to drive the fastening device into at least one workpiece. The elongated shank portion includes a plurality of intertwined helical ridges (plural thread starts). Preferably, the tip portion is configured and arranged to create a hole and threads by softening the material of a workpiece. Additionally, a method for creating an assembly by attaching a first workpiece to a second workpiece via the use of such a fastening device.

9 Claims, 8 Drawing Sheets (56) References Cited

U.S. PATENT DOCUMENTS

| | | | |
|---|---|---|---|
| 5,882,161 A | 3/1999 | Birkelbach | |
| 6,185,896 B1 * | 2/2001 | Roberts | F16B 25/0021 411/386 |
| 8,348,572 B2 | 1/2013 | Friederich et al. | |
| 8,939,692 B2 * | 1/2015 | Werthwein | F16B 25/106 411/386 |
| 9,109,619 B2 | 8/2015 | Pinzl et al. | |
| 9,151,307 B2 * | 10/2015 | Freis | F16B 5/02 |
| 9,200,661 B2 | 12/2015 | Bosco | |
| 9,488,210 B2 | 11/2016 | Freis | |
| 2009/0136319 A1 * | 5/2009 | Panasik | F16B 25/0031 411/404 |
| 2011/0289752 A1 * | 12/2011 | Werthwein | F16B 25/0021 29/428 |
| 2013/0047414 A1 * | 2/2013 | Werthwein | F16B 25/106 29/525.12 |
| 2015/0003933 A1 * | 1/2015 | Freis | F16B 5/02 411/378 |
| 2015/0176623 A1 * | 6/2015 | Vogel | F16B 25/0021 411/387.4 |

OTHER PUBLICATIONS

Sprovieri, John, "Flow-Drilling Screws Help Carmakers Shed Weight," Assembly Magazine, Feb. 1, 2016, retrieved Feb. 19, 2018, pp. 1-22, https://www.assemblymag.com/articles/93220-flow-drilling-screws-help-carmakers-shed-weight.

Tripp, Terry and Breidenbaugh, Eric, High-Strength Lightweight Joints Using 'Flow Drill Screw' Technology, Lightweighting World, Mar. 13, 2017, retrieved Feb. 3, 2018, pp. 1-5, http://lightweightingworld.com/high-strength-lightweight-joints-using-flow-drill-screw-technology/.

* cited by examiner

FASTENING DEVICE AND METHOD

The present invention relates generally to a fastening device and a method of creating an assembly with the fastening device, and more particularly to a fastening device such as a fastener which forms its own hole and threads (such as a flow drill screw) that includes at least two helical intertwined ridges, and a method of creating an assembly with such a fastener.

BACKGROUND OF THE INVENTION

In most industries, efficiency of production is an important consideration. For example, in industries that rely upon the assembly of components via fasteners, such as the automotive industry, efficiency can be gained by reducing the time it takes to form an assembly of two or more components or layers. Due to the large number of fasteners employed to assemble a complex product, such an automobile, the cumulative result of any reduction in the time involved in the fastener insertion process can be meaningful, regardless of whether the process is automated or manual. Further, efficiency can also be realized by reducing the number of steps, such as by eliminating previously required steps, in any repetitive assembly process. Although the automotive industry provides a ready example of the importance of improving efficiencies, improving efficiencies is important to any industry that employs repetitive processes for assembling components or layers via fasteners.

Thus, objects of the present invention include improving efficiencies in repetitive processes for assembling components or layers via fasteners.

BRIEF SUMMARY OF THE INVENTION

The above-listed objects are met or exceeded by the present fastening device and method of fastening components together which features a fastening device that includes multiple intertwined threads, as well as a method for creating an assembly with such a fastener. Such a fastener reduces the time required for insertion by reducing the number of rotations needed for full insertion, when compared to a traditionally threaded fastener of the same usable thread length.

Preferably, in addition to the multiple intertwined threads, the present fastening device also includes flow drill features, whereby the fastener is configured to be rotated with sufficient speed and pressure to soften the material(s) of the workpiece while creating a hole therein, thereby creating an elongated hollow extrusion for receiving the threaded portion of the fastening device. Such a configuration creates efficiencies by eliminating process steps involved in a variety of prior art processes, such as a step of forming a pilot hole, a step of tapping a receiving hole, a step of applying a securing nut to opposite side of the assembly, etc. Further, even in embodiments where an aperture is provided in one or more of the layers being affixed together, such aperture is preferably unthreaded. The present threaded fastener and method also enable more processing flexibility because it can be accomplished via one-sided access to the workpiece.

More specifically, the present invention provides a fastening device that includes an elongated shank portion extending longitudinally between a first shank end and a second shank end; and a head portion arranged at the second shank end, wherein the head portion includes a drive arrangement configured and arranged for receiving a rotary driving force to drive the fastening device into at least one workpiece. The elongated shank portion further includes a tip portion provided at the first shank end, wherein the tip portion is configured and arranged to create a hole and threads by softening the material of a workpiece; and a threaded portion provided between the tip portion and the second shank end. The threaded portion includes a first helical ridge extending from a first helical ridge start portion to a first helical ridge end portion and a second helical ridge extending from a second helical ridge start portion to a second helical ridge end portion, wherein the first helical ridge start portion and the second helical ridge start portion are both separated from the tip portion by the same longitudinal distance, defined as distance A.

Additionally, in certain embodiments of the present fastening device, the first helical ridge end portion and the second helical ridge end portion are both separated from the tip portion by the same longitudinal distance, defined as distance B, wherein the distance B is greater than the distance A.

Additionally, certain embodiments include a third helical ridge extending from a third helical ridge start portion to a third helical ridge end portion, wherein the third helical ridge start portion is separated from the tip portion by the distance A.

Further, certain embodiments also include a fourth helical ridge extending from a fourth helical ridge start portion to a fourth helical ridge end portion, wherein the fourth helical ridge start portion is separated from the tip portion by the distance A.

Some embodiments of the present fastening device also include a non-threaded intermediate portion between the tip portion and threaded portion.

In certain embodiments, the tip portion includes a point at a longitudinal end thereof and a plurality of facets extending in the longitudinal direction from the point.

Further, in some embodiments, an outermost radial edge of each of the first and second helical ridges within a usable thread zone defines a constant diameter along the longitudinal length of the threaded section.

Also, in certain embodiments the threaded portion includes a lower threaded portion, defined as a thread forming zone, and an upper threaded portion, defined as a usable thread zone, wherein an outermost radial edge of each of the first and second helical ridges in the thread forming zone increases along the longitudinal length towards the head portion and wherein an outermost radial edge of each of the first and second helical ridges in the usable thread zone is of a constant diameter.

Further, in certain versions of the present fastening device, an underside surface of said head portion includes an annular undercut portion therein; and the head portion includes a base portion that supports a raised cap portion, and a plurality of recesses are formed in the cap portion to define a plurality of lobes therebetween, and further wherein each of the lobes includes an inclined ramp portion which extends downwardly from an upper peripheral surface of the raised cap portion by at least 5° with respect to a flat plane coincident with the upper surface of the raised cap portion.

The present invention also relates to a method for creating an assembly by attaching a first workpiece to a second workpiece via a flow drill screw, wherein the method includes the steps of: superposing the second workpiece on the first workpiece to create a superposed structure; providing a flow drill screw comprising an elongated shank portion extending longitudinally between a first shank end and a second shank end and a head portion arranged at the second shank end. The elongated shank portion further includes a tip portion provided at the first shank end; and a threaded portion provided between the tip portion and the second shank end, wherein the threaded portion includes a first helical ridge extending from a first helical ridge start portion to a first helical ridge end portion and a second helical ridge extending from a second helical ridge start portion to a second helical ridge end portion, wherein the first helical ridge start portion and the second helical ridge start portion are both separated from the tip portion by the same longitudinal distance, defined as distance A. The method further includes positioning the flow drill screw such that a drive member of a drive system is in operational contact with a drive arrangement of the head portion the flow drill screw; rotating the drive member of the drive system while in operational contact with the drive arrangement of the flow drill screw, thereby rotating the flow drill screw; bringing the flow drill screw into contact with a target area of the superposed structure while the flow drill screw is being rotated, wherein the second workpiece lacks an aperture in the target area; penetrating the target area of the superposed structure with the tip portion of the rotating flow drill screw; forming a through-draft in the superposed structure by continued rotation of the rotating flow drill screw; forming a first thread and a second thread in the through-draft via rotational engagement of the first helical ridge and the second helical ridge, respectively, with an inner periphery of the through-draft; fully engaging the entire length of the first thread with the first helical ridge and fully engaging the entire length of the second thread with the second helical ridge by continued rotation of the rotating flow drill screw; and tightening of the flow drill screw by continued rotation of the rotating flow drill screw, thereby forming the assembly. During the penetrating, the forming of the though-draft, the forming of the first and second threads, the fully engaging of the entire length, and the tightening, the rotating flow drill screw is moved in the longitudinal direction, and during the method, heat generated by friction from the rotating flow drill screw causes material of at least one of the first and second workpieces to soften, whereby such softened material flows out of the through-draft to form a hollow extrusion.

In certain embodiments of the method, the first workpiece lacks an aperture in the target area.

Further, the steps of bringing the flow drill screw into contact with the target area, penetrating the target area, forming the through-draft, forming the first and second threads in the through-draft, fully engaging the entire length of the first and second threads with the first and second helical ridges, and tightening of the flow drill screw to thereby form the assembly, in certain embodiments, are all fully performed via access from a side of the superposed structure associated with the second workpiece, without a need for access to an opposite side of the superposed structure associated with the first workpiece.

In certain embodiments, the resulting assembly is a component of a vehicle, such as an automobile.

In certain embodiments of the method, the head portion of the flow drill screw includes a base portion that supports a raised cap portion, and a plurality of recesses are formed in the cap portion to define a plurality of lobes therebetween, and further wherein each of the lobes includes an inclined ramp portion which extends downwardly from an upper peripheral surface of the raised cap portion by at least 5° with respect to a flat plane coincident with the upper surface of the raised cap portion.

In some embodiments, the hollow extrusion formed from the softened material extends in the longitudinal direction from both a side of the superposed structure associated with the first workpiece and from an opposite side of the superposed structure associated with the second workpiece.

Further, in certain embodiments, the flow drill screw further includes a third helical ridge extending from a third helical ridge start portion to a third helical ridge end portion, wherein the third helical ridge start portion is separated from the tip portion by the distance A, and further wherein the method also comprises forming a third thread in the through-draft via engagement of the third helical ridge with the inner periphery of the through-draft.

Finally, the present invention also relates to a method for creating an assembly by attaching a first workpiece to a second workpiece via a flow drill screw, wherein the method includes the steps of:

superposing the second workpiece on the first workpiece to create a superposed structure;

providing a flow drill screw comprising an elongated shank portion extending longitudinally between a first shank end and a second shank end and a head portion arranged at the second shank end, wherein the elongated shank end further comprises a tip portion provided at the first shank end and a threaded portion provided between the tip portion and the second shank end, wherein the threaded portion includes a first helical ridge and a second helical ridge, and further wherein the first and second helical ridges are intertwined along at least a portion thereof;

positioning the flow drill screw such that a drive member of a drive system is in operational contact with a drive arrangement of the head portion the flow drill screw;

rotating the drive member of the drive system while in operational contact with the drive arrangement of the flow drill screw, thereby rotating the flow drill screw;

bringing the flow drill screw into contact with a target area of the superposed structure while the flow drill screw is being rotated, wherein the second workpiece lacks an aperture in the target area;

penetrating the target area of the superposed structure with the tip portion of the rotating flow drill screw;

forming a through-draft in the superposed structure by continued rotation of the rotating flow drill screw;

forming a first thread and a second thread in the through-draft via rotational engagement of the first helical ridge and the second helical ridge, respectively, with an inner periphery of the through-draft;

fully engaging the entire length of the first thread with the first helical ridge and fully engaging the entire length of the second thread with the second helical ridge by continued rotation of the rotating flow drill screw; and tightening of the flow drill screw by continued rotation of the rotating flow drill screw, thereby forming the assembly;

wherein during the penetrating, the forming of the though-draft, the forming of the first and second threads, the fully engaging of the entire length, and the tightening, the rotating flow drill screw is moved in the longitudinal direction, and wherein during the method, heat generated by friction from the rotating flow drill screw causes material of at least one of the first and second workpieces to soften, and whereby such softened material flows out of the through-draft to form a hollow extrusion.

BRIEF DESCRIPTION OF THE SEVERAL
VIEWS OF THE DRAWINGS

Preferred embodiments of the present invention are described herein with reference to the drawings wherein.

DETAILED DESCRIPTION OF THE INVENTION

Figure 1:
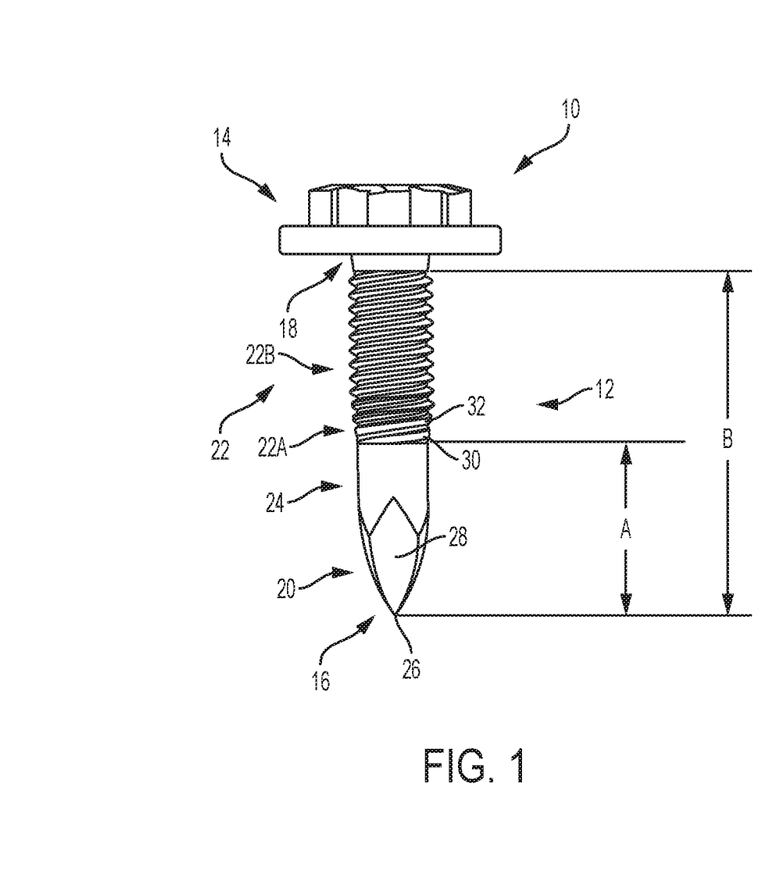
FIG. 1 is an elevation view of an example of the present fastening device that includes two helical ridges.

Turning now to FIGS. 1-9, various examples of features of the present fastening device are shown and will be described. FIG. 1 shows a side view of an example of a fastening device 10 of the present invention that includes a pair of helical ridges (threads) extending along a portion of the shaft. As described more fully below, the present invention relates to a fastening device that includes both: (i) flow drill features (which enable, among other things, for one-sided insertion because there is no need for supporting the fastener from the backside, and which allows for insertion into a workpiece without the need for a pilot hole, if desired); and (ii) multiple intertwined helical ridges (which enable faster insertion time, among other benefits), such as the inclusion of between two and five (or more) intertwined helical ridges (i.e., multiple thread starts) in a single fastening device. In preferred embodiments, the present fastening device is in the form of a fastener which forms its own hole and threads, such as a flow drill screw.

FIG. 1 shows an elevational view of the fastening device 10, which in this embodiment is a flow drill screw, that includes an elongated shank portion 12 and a head portion 14. The elongated shank portion 12 extends longitudinally between a first shank end 16 and a second shank end 18. The head portion 14 is arranged at the second shank end 18, and it includes a drive arrangement (described below) that is configured and arranged for receiving a rotary driving force to drive the fastening device 10 into a single workpiece, or into a plurality of superposed workpieces. Although it is contemplated that the drive arrangement may be any type of conventionally known drive arrangement (either an internal drive arrangement, such as slotted, Phillips, Torx, square, hex, socket, etc. or an external drive arrangement, such as hex, 12-point, line head, Torx, Torx Plus, etc., at least one example of an improved drive arrangement will be discussed below, with reference to FIG. 4.

Turning back to FIG. 1, the elongated shank portion 12 includes a tip portion 20, that is provided at the first shank end 16, and a threaded portion 22. The threaded portion 22 of certain embodiments can be considered to be divided into a thread forming zone 22A (or lower threaded portion) and a useable thread zone 22B (or upper threaded portion). The thread forming zone 22A forms a transitional region leading up to the usable thread zone 22B. Such transitional region may consist of partially formed threads, fully formed threads of reduced dimensions, or specially designed transition threads which are sharp crested an increase in thread height to full body size going longitudinally upwards toward the head portion 14.

In certain embodiments, an outermost radial edge of each of the first and second helical ridges 30, 32 in the thread forming zone 22A increases along the longitudinal length towards the head portion 14, and an outermost radial edge of each of the first and second helical ridges 30, 32 in the usable thread zone 22B is of a constant diameter. In certain embodiments, the shank portion 12 also includes a non-threaded intermediate portion 24 between the tip portion 20 and the threaded portion 22, although for certain applications the non-threaded intermediate portion may be omitted or substantially reduced in length.

In certain embodiments, the tip portion 20 includes a relatively sharp point 26 at a longitudinal end thereof and a plurality of facets 28 that extend upwardly in the longitudinal direction from the point 26. However, it is also contemplated that the tip portion 20 could include a blunt or somewhat rounded end, and that the facets 28 could be omitted or be replaced with another configuration, such as a plurality of material deforming ribs, which could be used to facilitate the hole-forming process.

One of the important features of the present invention is that the threaded portion 22 includes at least two intertwined helical ridges, each with a ridge start portion (towards the bottom) and a ridge end portion (towards the top). The FIG. 1 embodiment includes two such helical ridges that are intertwined with each other such that when they are considered from the side view of FIG. 1 going in the longitudinal direction, the two helical ridges appear to be alternating with each other. Briefly, FIG. 1 shows a first helical ridge 30 and a second helical ridge 32, where the first helical ridge 30 and the second helical ridge 32 each include a ridge start portion (i.e., a first ridge start portion and a second ridge start portion, respectively) that is separated from the tip portion 20 by the same longitudinal distance, defined as distance A as shown in FIG. 1. The first helical ridge 30 and the second helical ridge 32 also each include a ridge end portion (i.e., a first ridge end portion and a second ridge end portion, respectively) that is separated from the tip portion 20 by the same longitudinal distance, defined as distance B as shown in FIG. 1. In other words, the first helical ridge 30 starts at a point that is distance A from the tip portion 20, and winds upwardly in a helical fashion until reaching the distance B. Similarly, the second helical ridge 32 also starts at a point that is distance A from the tip portion 20, and winds upwardly in a helical fashion until reaching the distance B, such that the first and second helical ridges are intertwined with each other along their entire lengths. As can be seen in FIG. 1, distance B is greater than distance A.

Although the first ridge start portion and the second ridge start portion of the FIG. 1 embodiment are both located at the same longitudinal (or axial) distance from the tip (distance A), they are naturally located at different radial locations from each other. Specifically, the first and second ridge start portions are shifted from each other by 180°. Likewise, the first and second ridge end portions are also shifted from each other by 180° in the FIG. 1 embodiment.

Figure 2:
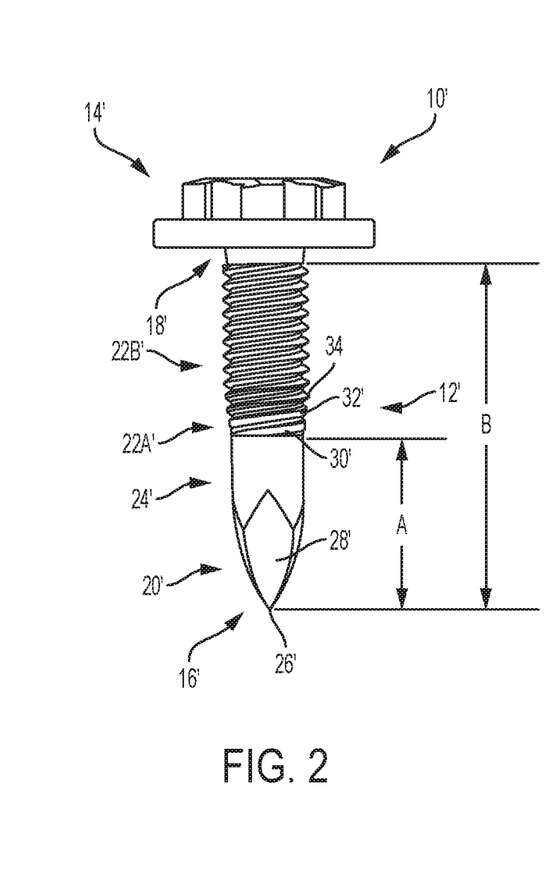
FIG. 2 is an elevation view of an example of the present fastening device that includes three helical ridges.

Turning now to FIG. 2, this figure depicts an elevational view of a fastening device 10', which in this embodiment is a flow drill screw, and which includes features very similar to those of the FIG. 1 embodiment, except that the FIG. 2 embodiment includes three intertwined helical ridges, whereas the FIG. 1 embodiment includes only two intertwined helical ridges. As the FIG. 2 embodiment includes many similar features to those of the FIG. 1 embodiment, those features will be represented by the same reference number but with a prime symbol (such as shank portion 12 of FIG. 1 being shown as shank portion 12' in FIG. 2, head portion 14 of FIG. 1 being shown as head portion 14' in FIG. 2, etc.), and only the different features will be discussed. In particular, in addition to the first and second helical ridges 30' and 32' (which are also provided in the FIG. 1 embodiment), the FIG. 2 embodiment also includes a third helical ridge 34. The first helical ridge 30', the second helical ridge 32' and the third helical ridge 34 are intertwined with each other. Additionally, as with the first helical ridge 30' and the second helical ridge 32', the third helical ridge 34 extends from a third helical ridge start portion to a third helical ridge end portion. Thus, all three helical ridges (30', 32' and 34) all start at point that is distance A from the tip portion 20', and each of the three ridges wind upwardly in a helical fashion until reaching the distance B, such that all three helical ridges are intertwined with each other along their entire lengths.

Although the first ridge start portion, the second ridge start portion, and the third ridge start portion of the FIG. 2 embodiment are all located at the same longitudinal (or axial) distance from the tip, they are naturally located at different radial locations from each other. Specifically, the first, second, and third ridge start portions are shifted from each other by 120°. Likewise, the first, second, and third ridge end portions are also shifted from each other by 120° in the FIG. 2 embodiment. When additional intertwined helical ridges are provided in different embodiments, such as by providing "n" helical ridges, the start portions of each ridge are shifted from each other by 360°/n (i.e., if four ridges are provided, the start portions are radially shifted from each other by 90° (360°/4) or if five ridges are provided, the start portions are radially shifted from each other by 72° (360°/5), etc.). Likewise, the end portions of each helical ridge on a single fastening device are also radially shifted from each other by the same amount as the start portions of each embodiment (360°/n). It should be noted that the start portions and the end portions of a single helical ridge on a single fastening device may or may not be radially aligned with each other, depending on the axial length of the threaded portion.

Figure 3:
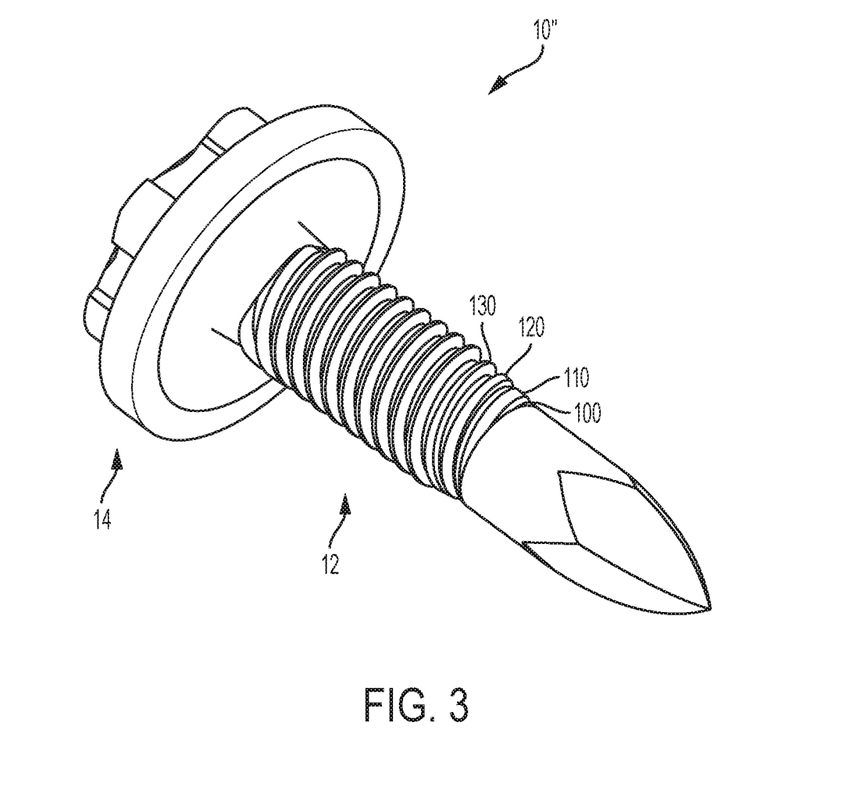
FIG. 3 is a perspective view of an example of the present fastening device that includes four helical ridges.
Figure 7:
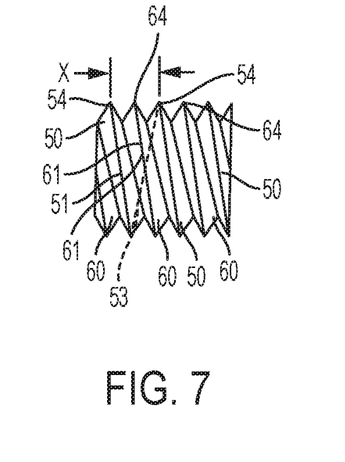
FIG. 7 is a schematic side view of a section of a threaded portion of an example of the present fastening device that includes two helical ridges.

Turning now to FIG. 3, a perspective view of a flow drill screw 10" that includes four helical ridges is shown. A segment of the threaded portion of the FIG. 3 embodiment is shown in FIG. 7. In the view of FIG. 3, only a small portion of the start portion of the first helical ridge 100 can be seen, but the full start portion of the second helical ridge 110 can be clearly seen. Additionally, the start portion of the third helical ridge 120 is just slightly out of view, and the start portion of the fourth helical ridge 130 is completely out of view, as it is on the opposite side of the shank 14 from the start portion of the first helical ridge 110.

Figure 4:
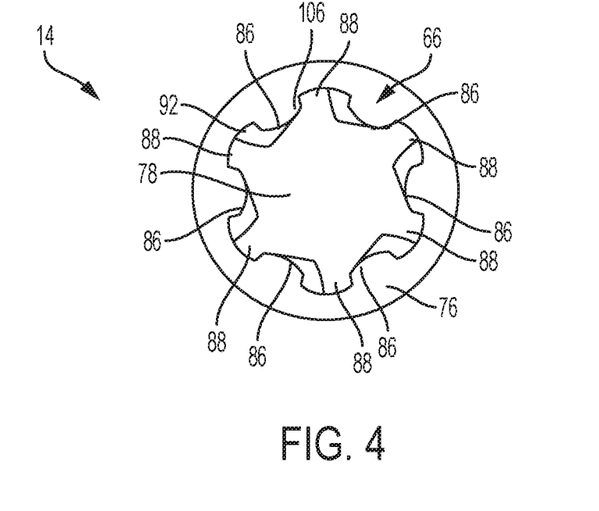
FIG. 4 is a top view of the head portion of an example of the present fastening device.

Turning now to FIG. 4, a top view of the head portion 14 of any of the present flow drill screws is provided. In the FIG. 4 view, one example of a drive arrangement 66 including an enhanced feature can be seen. Specifically, the head portion 14 includes a base portion 76 that supports a raised cap portion 78. There are a plurality of recesses 86 in the cap portion 78 that define a plurality of lobes 88 therebetween. Each of the lobes 88 includes a ramp portion 92 which extends downwardly from an upper peripheral surface of the raised cap portion 78 by at least 5° with respect to a flat plane coincident with the upper surface of the raised cap portion 78. These ramp portions 92 are formed on each lobe 88 in the clockwise direction side for facilitating engagement of a drive tool rotating in the clockwise direction. In particular, when the drive tool, which has a complementary lobe/recess shape, engages the drive arrangement 66, the ramp portion 92 facilitates engagement of the lobes by allowing the drive tool to slide into engagement with an edge 106 of the next adjacent lobe in the clockwise direction. Such facilitation of engagement improves the fastener insertion process by reducing the time that it takes for engagement between the drive tool and the drive arrangement 66, thereby reducing the time from initial contact between the drive tool and the drive arrangement to operational contact that results in rotation of the fastening device. It should be noted that although six lobes 88 are shown in FIG. 4, other configurations including a different number of lobes (between three and eight, or more) are also contemplated as being within the scope of the invention. Further, the incline angle of the ramps mentioned above could be within the range of 5°-40°, or preferably within the range of between 10° and 30°. Further, it should be noted that the ramp portion 92 need not extend to reach the base portion 76, but instead preferably only extends a slight axial distance downwardly from the upper surface of the associated lobe.

Figure 5:
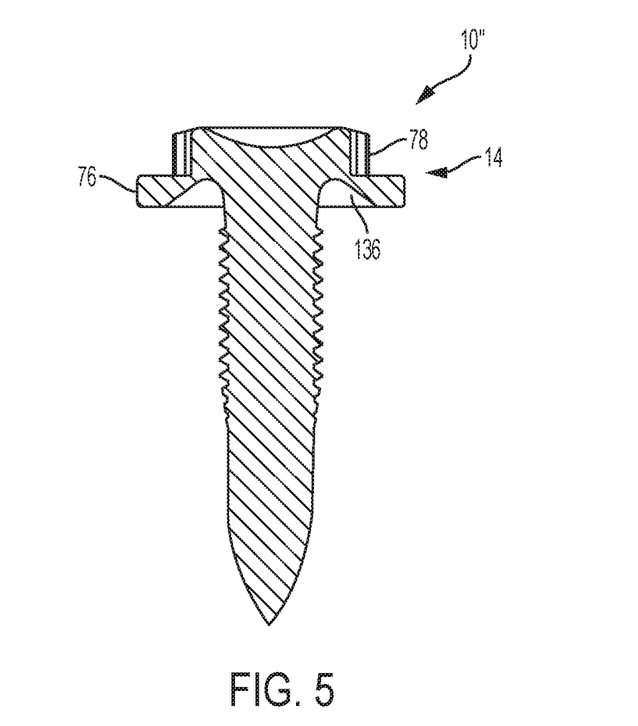
FIG. 5 is a sectional side view of one example of the present invention showing an undercut portion in the head portion.

FIG. 5 is a sectional side view of the four helical ridge embodiment 11" of FIGS. 3 and 7, which is being provided primarily to show how the head portion 14 includes an annular undercut portion 136. This annular undercut portion 136 is optionally provided in the base of the head portion 14 to provide a space for the flowed/extruded material (such as material 72A of FIG. 11B) to be received, as explained more fully below with reference to FIG. 11F.

Figure 6:
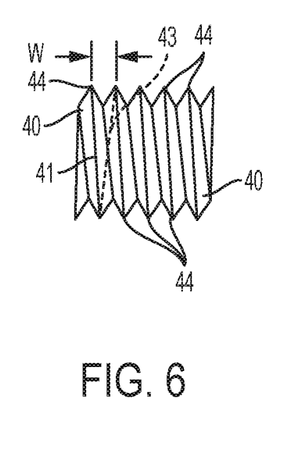
FIG. 6 is a schematic side view of a section of a threaded portion of a comparative example of a fastening device that includes a single helical ridge.
Figure 8:
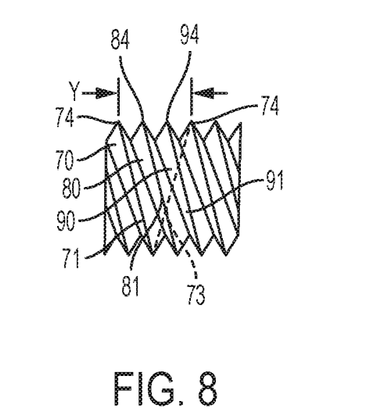
FIG. 8 is a schematic side view of a section of a threaded portion of an example of the present fastening device that includes three helical ridges.
Figure 9:
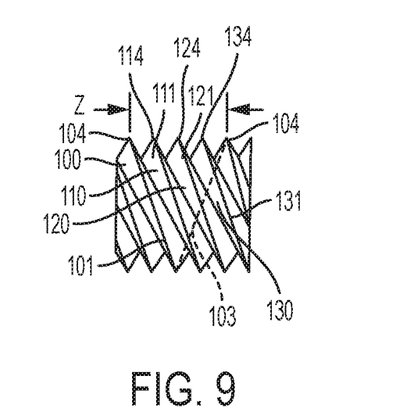
FIG. 9 is a schematic side view of a section of a threaded portion of an example of the present fastening device that includes four helical ridges.

In order to help better illustrate the concept of the intertwined helical ridges, FIGS. 6-9 will be discussed next. FIGS. 6-9 are each a schematic side view of a segment of a threaded portion of a different fastening device, where FIG. 6 represents a comparative example of a fastening device that includes a single helical ridge; FIG. 7 represents an example of the present fastening device that includes two (2) helical ridges; FIG. 8 represents an example of the present fastening device that includes three (3) helical ridges; and FIG. 9 represents an example of the present fastening device that includes four (4) helical ridges.

In particular, the comparative example of FIG. 6 shows a single helical ridge 40 including a crest 41 of the helical ridge defining a peak 44. The dashed line 43 represents the continuation of the crest of the same single helical ridge 40 on the opposite side of the shank, thereby defining a pitch W between peaks 44. In the FIG. 6 example, each of the peaks 44 are part of the same single helical ridge 40.

FIG. 7 represents an example of the present invention, and this example includes two intertwined helical ridges (as in the FIG. 1 embodiment) consisting of a first helical ridge 50 and a second helical ridge 60. The first helical ridge 50 includes a first crest 51 defining a peak 54, and the dashed line 53 represents the continuation of the first crest 51 of the same first helical ridge 50, but on the opposite side of the shank. The first peaks 54 of the same first helical ridge define a pitch X between peaks, where in this example the pitch X is twice that of pitch W of FIG. 6 (assuming that the dimensions of both of the helical ridges of FIG. 7 are the same as the dimensions of the single helical ridge of FIG. 4). The second helical ridge 60 of the FIG. 7 example includes a second crest 61 defining a second peak 64. As can be seen in FIG. 7, the first and second helical ridges 50 and 60, as well as the first and second peaks 54 and 64, alternate with each other in the longitudinal direction of the shaft.

FIG. 8 represents another example of the present invention, and this example includes three intertwined helical ridges (as in the FIG. 2 embodiment) consisting of a first helical ridge 70, a second helical ridge 80, and a third helical ridge 90. The first helical ridge 70 includes a first crest 71 defining a peak 74, and the dashed line 73 represents the continuation of the first crest 71 of the same first helical ridge 70, but on the opposite side of the shank. The first peaks 74 of the same first helical ridge 70 define a pitch Y between peaks, where the pitch Y in this example is three times that of pitch W of FIG. 6 (assuming that the dimensions of the three helical ridges of FIG. 6 are the same as the dimensions of the single helical ridge of FIG. 4). The second helical ridge 80 of the FIG. 6 example includes a second crest 81 defining a second peak 84, and the third helical ridge 90 includes a third crest 91 defining a third peak 94. As can be seen in FIG. 8, the first, second and third helical ridges (70, 80 and 90), as well as the first, second, and third peaks (74, 84 and 94), repeat in an A-B-C pattern in the longitudinal direction of the shaft.

FIG. 9 represents still another example of the present invention, and this example includes four intertwined helical ridges consisting of a first helical ridge 100, a second helical ridge 110, a third helical ridge 120, and a fourth helical ridge 130. The first helical ridge 100 includes a first crest 101 defining a peak 104, and the dashed line 103 represents the continuation of the first crest 101 of the same first helical ridge 100, but on the opposite side of the shank. The first peaks 104 of the same first helical ridge 100 define a pitch Z between peaks, where in this example the pitch Z is four times that of pitch W of FIG. 6 (assuming that the dimensions of the four helical ridges of FIG. 9 are the same as the dimensions of the single helical ridge of FIG. 6).

The second helical ridge 110 of the FIG. 9 example includes a second crest 111 defining a second peak 114, the third helical ridge 120 includes a third crest 121 defining a third peak 124, and the fourth helical ridge 130 includes a third crest 131 defining a third peak 134. As can be seen in FIG. 9, the first, second, third and fourth helical ridges (100, 110, 120, and 130), as well as the first, second, third and fourth peaks (104, 114, 124 and 134), repeat in an A-B-C-D pattern in the longitudinal direction of the shaft. Although not shown, it is also contemplated that a fastening device could be configured with five helical ridges (A-B-C-D-E pattern), six helical ridges (A-B-C-D-E-F pattern), or more, where each of the helical ridges of a single device being identical to each other, except with the location of the start portion being radially shifted.

As can be seen by comparing FIGS. 6, 7, 8 and 9 with each other, as more helical ridges are added, the helix angle of each helical ridge increases, if the other relevant parameters are maintained (such as radius, pitch, etc.), where the helix angle, as known in the art, can be considered as being ½ of the included angle defined between dashed line and the adjacent crest (such as the included angle between lines 41 and 43 of FIG. 6). Thus, for example, the helix angle of the FIG. 7 embodiment (with two helical ridges) is greater than that of the configuration shown in FIG. 6 (with a single helical ridge); the helix angle of the FIG. 8 embodiment (with three helical ridges) is greater than that of the FIG. 7 embodiment (with two helical ridges); and the helix angle of the FIG. 9 embodiment (with four helical ridges) is greater than that of the FIG. 8 embodiment (with three helical ridges). The increase in the helix angle results in the beneficial increase in resistance to strip-out torque.

Figure 10:
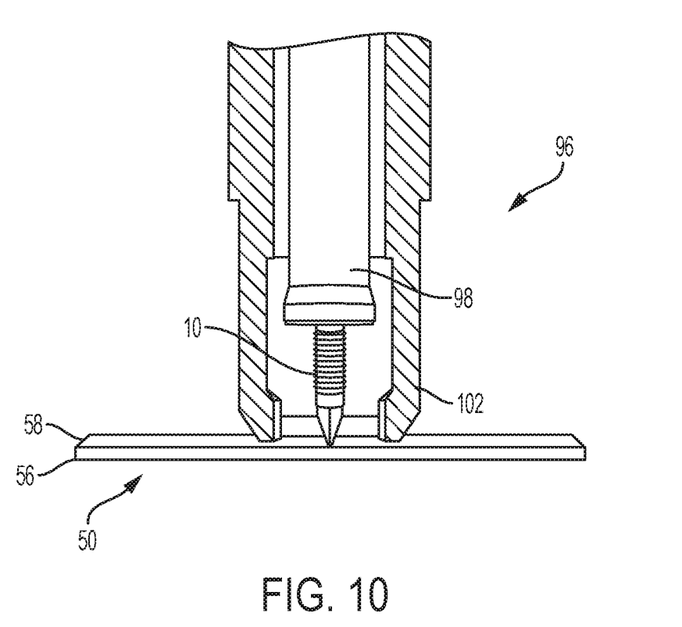
FIG. 10 is one example of a type of drive system that may be used for inserting the present fastening device into a workpiece.

Turning now to FIG. 10, this figure shows a schematic representation of one type of drive system 96 that includes a drive member 98 that is configured and arranged to be placed in operational contact with the drive arrangement 66 (FIG. 4) on the head portion 14 such that when the drive member 98 rotates, the fastening device 10 is rotated therewith at the same speed and in the same direction. In this embodiment of the drive system 96, a stabilizing frame 102 is also provided in order to stabilize the relevant components while the drive member 98 is rotated and downward force is applied thereto. For example, the drive member could be rotated at a predetermined speed of between 1000 rpm and 10,000 rpm, with a predetermined downward force applied thereto of between 300 N and 4,500 N. Of course other types of drive systems, both manual and powered, are also contemplated as being suitable for use with the current fastening device and method.

Turning now to FIGS. 11A-11F, one embodiment of a method for creating an assembly of two workpieces using the present fastening device, such as the present flow drill screw, is shown and will be described.

FIGS. 10 and 11A-11F all show a superposed, or layered, structure 50 consisting of a first workpiece 56 and a second workpiece 58, which is created by superposing (layering) the second workpiece 58 on the first workpiece 56 to create the superposed structure 50. The first and second workpieces 56 and 58 may each be of any suitable material (such as a sheet of aluminum, magnesium, steel, or other metal, plastic, carbon fiber reinforced plastic, carbon fiber, etc., where the first and second workpieces are of the same material or of different materials. Further, each of the workpieces may be of any suitable thickness, such as between 0.3 mm and 10.0 mm. Optionally, an adhesive may be provided between the first and second workpieces prior to inserting the fastening device therein. The first and second workpieces of the present invention could be used as components of a variety of different types of products, such as being provided as a component of a vehicle (such as an automobile, a truck, and SUV, farm equipment, construction equipment), as a component in a container, as a component in furniture, as a building material, etc. More specifically, when used in an automobile or truck, the finished assembly may be part of the vehicle's underbody, framing, body portions, or truck bed, etc. Further, although only the attachment of two workpieces is shown and described, the present method is also suitable for attaching three, four, or more workpieces (sheets) together to form an assembly.

The flow drill screw 10 of any of the embodiments discussed herein is provided, and as shown in FIG. 10, the screw is positioned such that a drive member 98 of the drive system 96 is in operational contact with a drive arrangement of the head portion 14 of the flow drill screw 10. As mentioned above, any suitable drive system can be used. Next, the drive member 98 of the drive system 96 is rotated while in operational contact with the drive arrangement of the flow drill screw 10, thereby rotating the flow drill screw.

It should be noted that although FIGS. 11A-11F omit the drive system and associated components for ease of description, the flow drill screw is still positioned in operational contact with the drive member in each of the stages depicted in FIGS. 11A-11F.

Figure 11A:
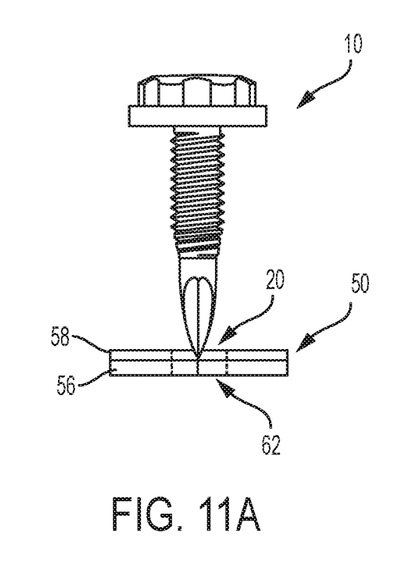
FIGS. 11A-11F are a series of side views showing the steps involved in one example of a method for inserting the present fastening device into a workpiece.

FIG. 11A is a depiction of the step of bringing the flow drill screw 10 into contact with a target area 62 (shows within dashed lines) of the superposed structure 50 while the flow drill screw 10 is being rotated by the drive member 98 (FIG. 10). It should be noted that one of the benefits of the present invention is that no pre-holes or other apertures are required in the target area of either of the workpieces 56 or 58. However, if desired a pre-hole may be provided in the upper sheet, which in this case would be the second workpiece 58. Such a pre-hole may be advantageous where the upper sheet is thick, or where more than two layers are stacked upon each other, such as with a three-layer structure, in which the top layer includes a pre-hole, or a four-layer structure, in which the upper two or three layers each include a pre-hole. However, even if such a pre-hole is provided in any of the layers, such a pre-hole does not need to be threaded. FIG. 11A also shows the results of penetrating the target area 62 of the superposed structure 50 with the tip portion 20 of the rotating flow drill screw 10.

Figure 11B:
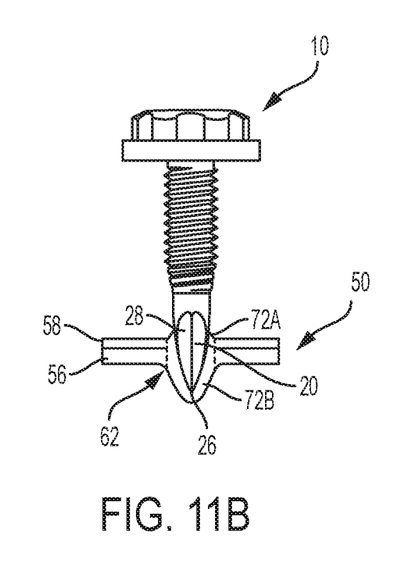

Turning now to FIG. 11B, as the flow drill screw 10 continues to be rotated by the drive member 98 (FIG. 10), the drive member moves downwardly in the longitudinal direction such that the point 26 of the tip portion 20 penetrates into the target area 62 of the superposed structure 50. As can be seen in FIG. 11B, the material adjacent the tip portion 20 softens from the heat generated by friction from the rotating flow drill screw, creating a flowed/extruded portion 72A/72B. More specifically, the combination of the selected rotation speed and the selected end load creates sufficient heat to soften the materials of the first and second workpieces 56, 58 to create the upper flowed/extruded portion 72A and the lower flowed/extruded portion 72B. Further, the shape of the tip portion 20, including any optional facets 28 (or other structure), is configured such that with sufficient rotational speed and longitudinal pressure, the material of the workpieces 56, 58 is not chipped or cut, but is instead flowed/extruded. Such a result is beneficial because, among other things, it eliminates the debris and related clean-up associated with other self-tapping processes, and the extruded/flowed portion 72A/72B forms a hollow extrusion that adds strength to the joint by increasing the threaded axial length beyond the thickness of the superposed structure 50.

Figure 11C:
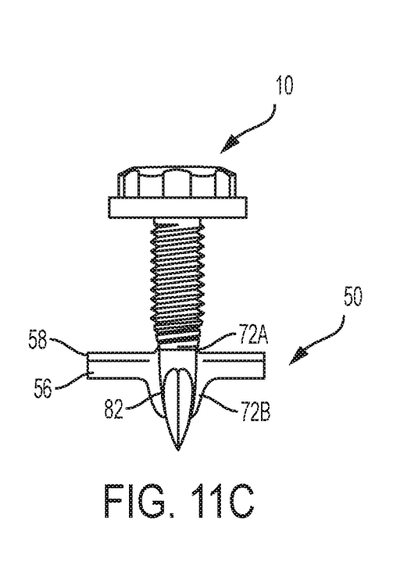

FIG. 11C shows how continued rotation of the rotating flow drill screw 10, along with continued longitudinal movement in the downward direction, results in the formation of a through-draft 82 in the superposed structure 50.

Figure 11D:
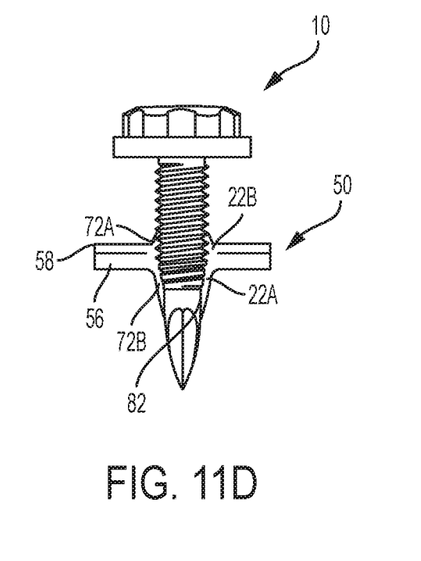
Figure 11E:
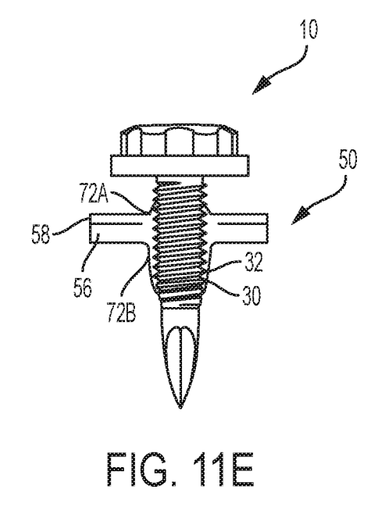

FIG. 11D-11E show the progress of the method with further continued rotation of the rotating flow drill screw 10, along with continued longitudinal movement in the downward direction. Specifically, FIG. 11D shows the thread forming step wherein the thread forming zone 22A passes into the through draft 82, which is still at least partially softened, to create the threads, followed by the usable thread zone 22. In an embodiment where the flow drill screw includes two helical ridge portions (first and second intertwined helical ridge portions), such as in the embodiments of FIGS. 1 and 5, the thread forming step results in the formation of a first thread and a second thread in the through-draft 82 via the rotational engagement of the first helical ridge and the second helical ridge, respectively, with an inner periphery of the through-draft 82. Of course, in embodiments in which the flow drill screw includes three helical ridge portions (such as in FIGS. 2 and 6), the thread forming step will result in the formation of a first thread, a second thread, and a third thread in the through-draft 82 via the rotational engagement of the first, second and third helical ridges, respectively, with an inner periphery of the through-draft 82. Likewise, in embodiments in which the flow drill screw includes four helical ridge portions (such as in FIG. 7), the thread forming step will result in the formation of a first thread, a second thread, and a third thread, and a fourth thread; and in embodiments with five helical ridge portions, the result will be five intertwined threads; six helical ridge portions will result in six intertwined threads, etc.

FIG. 11E depicts the stage of the process in which there is full engagement of the entire length of the first thread (on the inner periphery of the through-draft 82) with the first helical ridge 30 (of the flow drill screw 10) and there is full engagement of the entire length of the second thread (on the inner periphery of the through-draft 82) with the second helical ridge 32 by the continued rotation and downward movement of the rotating flow drill screw 10. Similar full engagement of the entire length of all of the threads on the inner periphery of the through-draft also occurs in cases in which there are more than two helical ridges (and thus a corresponding number of threads numbering more than two are also formed).

Figure 11F:
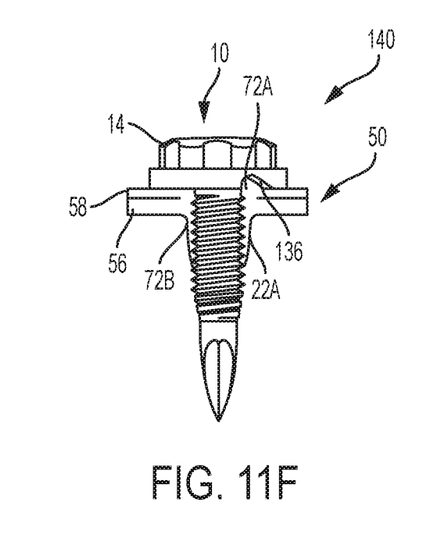

Finally, FIG. 11F shows how the continued rotation and downward movement results in the tightening of the flow drill screw 10, thereby forming the assembly 140. It should be noted that FIG. 11F depicts the screw head portion 14 in partial cutaway to show how the undercut portion 136 in the base of the head portion provides the necessary space for the upper flowed/extruded portion 72A, thereby enabling the screw head portion 14 to be in contact with the upper surface of the second workpiece 58.

As can be understood from a review of the above-description and FIGS. 10 and 11A-11F, the steps of bringing the flow drill screw 10 into contact with the target area 62 (FIG. 11A), penetrating the target area 62 (FIG. 11B), forming the through-draft 82 (FIG. 11C), forming the first and second threads in the through-draft 82 (FIG. 11D), fully engaging the entire length of the first and second threads with the first and second helical ridges (FIG. 11E), and tightening of the flow drill screw 10 to thereby form the assembly 140 (FIG. 11F) are all fully performed via access from a side of the superposed structure 50 associated with the second workpiece 58 (i.e., the upper side), without a need for access to an opposite side of the superposed structure associated with the first workpiece 56 (i.e., the lower side).

Figure 12:
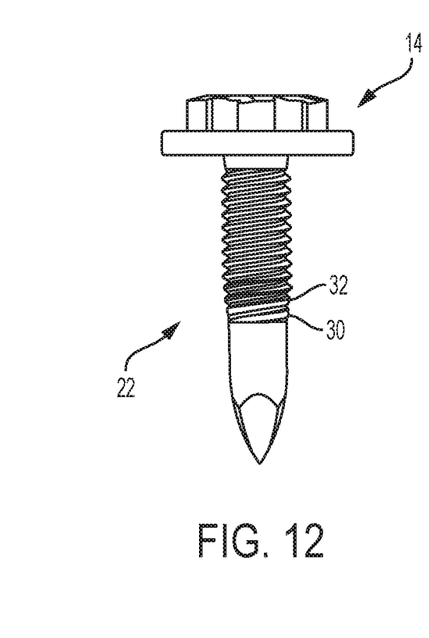
FIGS. 12-14 are side views of some examples of different helical ridge (thread) configurations capable of being used in conjunction with the multiple helical ridge features of the present fastening device.
Figure 13:
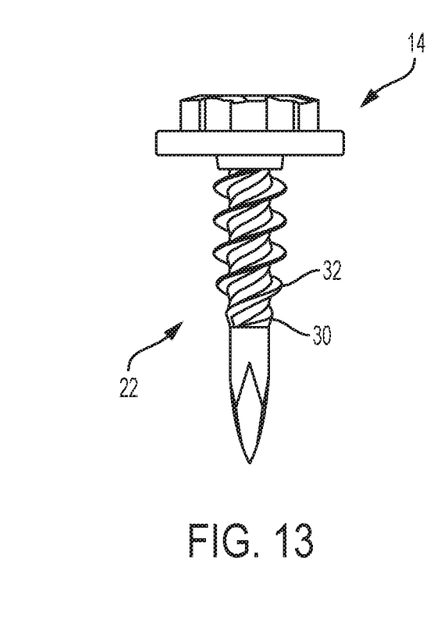
Figure 14:
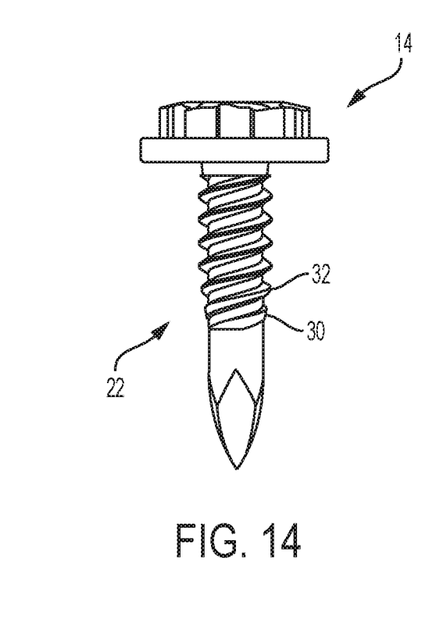

FIGS. 12, 13 and 14 depict various examples of different thread designs that could incorporate the features of the present invention (such as the multiple thread start feature and/or the enhanced drive feature, among others). In particular, FIG. 12 is an example of a two thread start screw that includes an asymmetrical thread design which could be used in metals, plastics, and carbon fiber; FIG. 13 is an example of a two thread start screw that includes a more aggressive thread design for materials such as plastics and engineered foams; and FIG. 14 is an example of a two thread start screw that includes a more customary thread design suitable for sue in plastics or metals.

While various embodiments of the present invention have been shown and described, it should be understood that other modifications, substitutions and alternatives may be apparent to one of ordinary skill in the art. Such modifications, substitutions and alternatives can be made without departing from the spirit and scope of the invention, which should be determined from the appended claims. Further, it should be noted that features from one embodiment can be incorporated into other embodiments.

Various features of the invention are set forth in the appended claims.

What is claimed is:

1. A fastening device comprising:
an elongated shank portion extending longitudinally between a first shank end and a second shank end; and
a head portion arranged at the second shank end, wherein the head portion includes a drive arrangement configured and arranged for receiving a rotary driving force to drive the fastening device into at least one workpiece;
wherein the elongated shank portion further comprises:
a tip portion provided at the first shank end, wherein the tip portion is configured and arranged to create a hole and threads by softening the material of a workpiece;
a threaded portion provided between the tip portion and the second shank end, wherein the threaded portion includes a first helical ridge extending from a first helical ridge start portion to a first helical ridge end portion and a second helical ridge extending from a second helical ridge start portion to a second helical ridge end portion, wherein the first helical ridge start portion and the second helical ridge start portion are both separated from the tip portion by the same longitudinal distance, defined as distance A; and
a non-threaded intermediate portion between the tip portion and threaded portion.

2. The fastening device according to claim 1, wherein the first helical ridge end portion and the second helical ridge end portion are both separated from the tip portion by the same longitudinal distance, defined as distance B, wherein the distance B is greater than the distance A.

3. The fastening device according to claim 1, further comprising a third helical ridge extending from a third helical ridge start portion to a third helical ridge end portion, wherein the third helical ridge start portion is separated from the tip portion by the distance A.

4. The fastening device according to claim 3, further comprising a fourth helical ridge extending from a fourth helical ridge start portion to a fourth helical ridge end portion, wherein the fourth helical ridge start portion is separated from the tip portion by the distance A.

5. The fastening device according to claim 1, wherein the tip portion includes a point at a longitudinal end thereof and a plurality of facets extending in the longitudinal direction from the point, and wherein the tip is configured and arranged such that during rotation of the fastening device while in contact with the workpiece, heat generated by friction causes the material of the workpiece to soften and said softened material flows out of a through-draft to form a hollow extrusion within the workpiece.

6. The fastening device according to claim 1, wherein an outermost radial edge of each of the first and second helical ridges within a usable thread zone defines a constant diameter along the longitudinal length of the threaded section.

7. The fastening device according to claim 1, wherein the threaded portion includes a lower threaded portion, defined as a thread forming zone, and an upper threaded portion, defined as a usable thread zone, wherein an outermost radial edge of each of the first and second helical ridges in the thread forming zone increases along the longitudinal length towards the head portion and wherein an outermost radial edge of each of the first and second helical ridges in the usable thread zone is of a constant diameter.

8. The fastening device according to claim 1, wherein:
an underside surface of said head portion includes an annular undercut portion therein; and
the head portion includes a base portion that supports a raised cap portion, and a plurality of recesses are formed in the cap portion to define a plurality of lobes therebetween, and further wherein each of the lobes includes an inclined ramp portion which extends downwardly from an upper peripheral surface of the raised cap portion by at least 5° with respect to a flat plane coincident with the upper surface of the raised cap portion.

9. The fastening device according to claim 1, wherein the tip portion is configured and arranged such that during rotation of the fastening device while in contact with the workpiece, heat generated by friction causes the material of the workpiece to soften and said softened material flows out of a through-draft to form a hollow extrusion within the workpiece.

* * * * *